United States Patent [19]
Werner

[11] 3,753,310
[45] Aug. 21, 1973

[54] FISH LURE
[76] Inventor: David C. Werner, 1625 Dutchess Ave., Dayton, Ohio 45420
[22] Filed: Oct. 5, 1971
[21] Appl. No.: 186,680

[52] U.S. Cl.............. 43/42.39, 43/42.44, 43/42.47
[51] Int. Cl............................................ A01k 85/00
[58] Field of Search................... 43/42.39, 42.44, 43/42.47

[56] References Cited
UNITED STATES PATENTS
| 2,604,718 | 7/1952 | Crumb | 43/42.39 |
| 2,425,272 | 8/1947 | Walker et al. | 43/42.47 |
| 1,744,366 | 1/1930 | Davenport | 43/42.44 |
| 1,341,618 | 5/1920 | Medley | 43/42.47 |

Primary Examiner—Louis G. Mancene
Assistant Examiner—Daniel J. Leach
Attorney—Roger S. Dybvig

[57] ABSTRACT

A bottom running fish lure with a restricted swing multiple hook constructed such that the hook barbs invariably point upwardly when the lure is in water, whereupon the lure may run over rocks without snagging. The lure includes a wiggle plate causing it to wobble from side to side and remain low in the water as it is retrieved.

4 Claims, 3 Drawing Figures

PATENTED AUG 21 1973
3,753,310
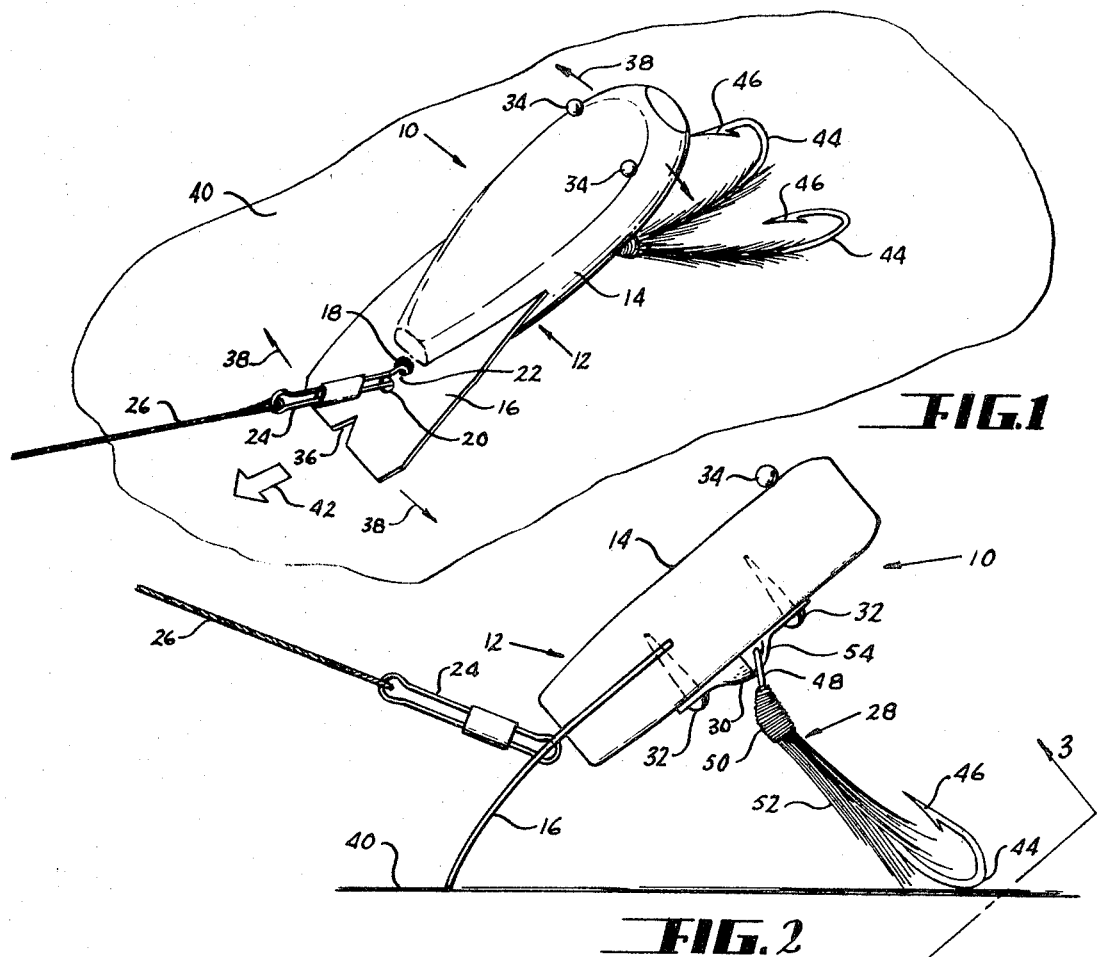
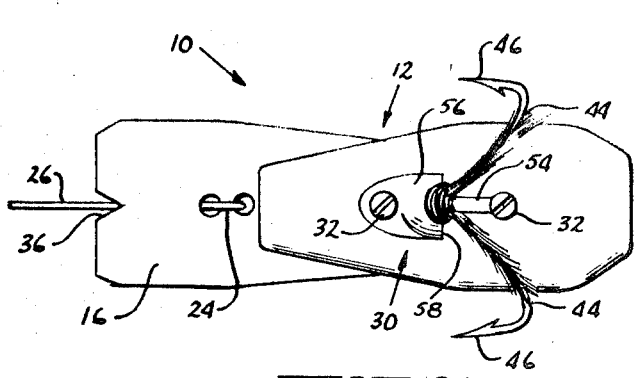
INVENTOR.
DAVID C. WERNER
BY Roger S. Dybvig
ATTORNEY

FISH LURE

BACKGROUND OF THE INVENTION

This invention relates to a fish lure and more particularly to a type of fish lure adapted to run along the bottom or bed of a body of water and which may be designed to simulate a crawfish or the like.

Prior fish lures have included float bodies with free swinging or restricted swinging multiple hooks. The advantages of multiple swinging hooks are well understood, such hooks being considered better than hooks rigidly affixed to float bodies because a fish attacking the lure is more likely to be hooked regardless of the angle of attack. Also fish lures with swinging hooks have been provided with diving plates or wiggle plates which cause the lure when it is being retrieved to wobble from side to side. A wiggle plate additionally causes a lure being retrieved to lower in opposition to the buoyant forces acting upon the float body. Prior lures of this type, however, are generally unsuited to use along the bottom or bed of a body of water because the free swinging hooks will tend to dig into the bed or become snagged in rocks or debris. Examples of prior lures are shown in U.S. Pat. Nos. 2,579,991, 2,742,729, 3,319,371, 3,541,718 and design U.S. Pat. Nos. 163,973 and 182,312.

Fish lures have also been developed for simulating crawfish or the like, some with upwardly extending hook barbs, examples of such lures being shown in U.S. Pat. Nos. 1,813,722, 1,976,695, 2,218,280, 2,575,626, 2,793,460 and 3,389,490.

SUMMARY OF THE INVENTION

This invention provides a bottom running fish lure, that is, a lure of the type which has a specific gravity relative to water such that it sinks in water. When retrieved it dives toward or runs along the bed. The lure retains the advantages of a multiple barbed swinging hook but, in accordance with this invention, the swinging hook is connected to a buoyant body member weighted at one end, whereupon the lure is invariably oriented in water with the weighted end pointing downwardly. A hook is pivotally attached to the body member at a point spaced from the weighted end with the plural barbs projecting away from the weighted end and generally upwardly. Further, the swinging movement of the hook toward and away from the body member is restricted. Accordingly, as the lure sinks, the barbs will invariably point generally upwardly. When the lure sinks to the bottom, the weighted end of the body member and the rearward bends of the hooks rest upon the bottom. The weighted end is formed as a wiggle plate and the fish line is connected to the wiggle plate along the line of symmetry thereof. When the lure is retrieved it remains at or near bottom with its hook barbs pointing upwardly and oscillates in well known fashion about its centerline. The lure is preferably designed broadly to simulate the appearance of a crawfish, and its motion while being retrieved is quite similar to the skittering, backwards running motion of a crawfish.

BRIEF DESCRIPTION OF THE DRAWINGS

FIG. 1 is a perspective view of a lure made in accordance with this invention attached to a fish line, the lure being illustrated on the bottom of a body of water.

FIG. 2 is a side elevational view of the lure oriented as shown in FIG. 1.

FIG. 3 is a plan view of the underside of the lure as viewed in the direction of arrows 3—3 of FIG. 2.

DESCRIPTION OF THE PREFERRED EMBODIMENT

Referring to the drawing, an embodiment of a fish lure in accordance with this invention is generally designated 10 and consists of a buoyant body member generally designated 12 including a float body 14 and a forwardly extending diving or wiggle plate 16 which has spaced apertures 18 and 20 along its centerline, the web portion 22 therebetween being adapted for connection to a slide link connector 24 of known design for attachment of a fish line 26 thereto. The lure 10 also includes a multiple barb hook generally designated 28 connected to the body member 12 and more specifically to the float body 14 by a restricted swing hanger or connector 30 which itself is attached to the underside of the float body 14 by screws 32.

The float body 14 may be made from wood, hollow plastic, or other suitable material, and is preferably symmetrical about a vertical plane containing its longitudinal centerline, the illustrated float being generally rectangular in form with substantially planar top and bottom surfaces, rounded edges and tapered sides, the greatest cross section of the float body 14 being near its rearward end. The rearward end is designed to be suggestive of the head end of a crawfish or the like and for this purpose is provided on its upper surface with bead headed pins 34 to simulate eyes.

The diving plate or wiggle plate 16 is connected to the forward end of the float body 14 in any suitable fashion. If, for example, the float body 14 is made from wood, it may be slotted at its forward end and along its vertical midline and the plate 16 inserted into the slot and held therein by a suitable adhesive. As shown in FIG. 2, the forwardmost hanger screw 32 is preferably threaded through an aperture, not shown, in the plate 16 to provide a rigid connection between the hanger 30 and the plate 16 and also to firmly hold the plate 16 in place. The plate 16 is also symmetrical about its longitudinal centerline and the vertical plane of symmetry of the plate 16 is coincident with the vertical plane of symmetry of the float body 14. The forward end of the plate 16 may optionally be notched as shown at 36, the pointed rearwardly extending end of the notch 36 lying in the plane of symmetry.

The multiple hook 28 may be made from any conventional construction, the particular hook 28 illustrated consisting of an elongate wire bent to form two rearwardly divergent shanks 44 terminating in upwardly extending barbs 46. The shanks are of sufficient length that the barbs can be swung to a rearward position beyond the end of the float body 14. Th midportion of the wire at which the shanks are joined together is formed into a loop 48, which loop is closed by whipping 50 wrapped around the shanks 44. The whipping 50 additionally serves to mount crawfish pincer simulating stork or maribou feathers, squirrel tail, or the like material 52 partially covering the shanks 44. The hanger or connector 30 is of a commercially available type having a strap portion 54 and a plate portion 56, the midportions of which are formed downwardly, the loop 48 being assembled onto the strap portion 54. The plate portion 56 terminates in a rearwardly facing edge 58. As apparent, the construction is such that the shanks 44, and, accordingly, the barbs 46 may pivot about a horizontal axis normal to the plane of symmetry from a position at which the shanks 44 would lie against the underside of the float body 14 downwardly through an angle on the order of 100°-120° to a position at which the shanks 44 engage the edge 58.

The connector 30 is positioned along the plane of symmetry of the buoyant body member 12 with the strap extending longitudinally of the float body 14. Accordingly, the multiple hook 28 is suspended from the same plane of symmetry. The hook 28 itself is normally symmetrical about the same plane so as not to unbalance the lure while it sinks. The construction of the connector 30 is such that, in addition to the above described restricted arc through which the hook 28 may swing toward and away from the float body 14 about a horizontal axis, the hook 28 may also swing through an angle on the order of 180°-200° about a vertical axis lying in the plane of symmetry.

In oeration, the forward end of the lure body member 12, since weighted by the plate 16, extends downwardly when the lure is cast into water. The float body 14, the plate 16 and the multiple hook 28 are so constructed that their combined specific gravity relative to water is sufficient that the lure 10 will sink in water and reach the bottom or bed 40. In the particular lure illustrated, the hook 28 and connector 30 add sufficient weight rearwardly of the plate 16 and underneath the float body 14 that the lure will sink in substantially the attitude shown in FIGS. 1 and 2 and, when the lure reaches the bed 40, it rests upon the forward edge of the plate 16 and the rearwardly located bights of the hook shanks 44. Until the line 26 is retrieved, the lure will tend to remain substantially in the position illustrated in FIGS. 1 and 2.

As known to those familiar with the art, the plate 16 during retrieval will be pulled by the fish line 26 by a force acting in a direction lying in the plane of symmetry. Because of the forces acting upon lures of this general shape, a pull directed in the plane of symmetry will result in the lure oscillating as indicated by the small arrows 38. As also known to those familiar with the art, the plate 16 will cause the lure to tend to move downwardly in the water during retrieval. In this case, since the lure is intended to operate along the bottom or the bed 40 of the body of water, the net cooperative effect of the line 26 pulling in a direction lying in the plane of symmetry, the shape of the float body 14, and the shape and location of the wiggle plate 16, is to cause the lure 10 to ride along the bed 40, oscillating about the plane of symmetry, whereupon it is retrieved along the bed 40 in the direction of the arrow 42. Occasionally when the forward pull is rapidly exerted by the line 26, or when the plate 16 strikes pebbles or the like on the bed 40, the lure will rise slightly above the bed and then typically drop back so that its normal position in water will be as illustrated in FIGS. 1 and 2. Here it may be noted that the wiggle plate 16 is gently curved along its length. Such curvature has been found desirable because it has been found that a straight wiggle plate will trip over pebbles or the like, whereupon the desired action of the lure is disrupted.

Because of the pivotal mounting of the loop 48 to the strap 54, the oscillating movement described above is not directly transmitted to the hook 28. That is, the hook 28 does not oscillate with the body member 12. Rather the hook member 28 will tend to follow more of a straight line. In case of extreme side-to-side oscillations of the body member 12, the hook will tend to dampen the oscillation and hold the body member 12 along more of a straight course.

Thus it is seen that the barbs 46 invariably point upwardly when the lure 10 sinks in water, when it settles on the bottom, and when it is retrieved. It may be observed that a pivotal connection of the hook 28 to the float body 14 could be constructed to permit the hook 28 to rotate through an arc greater than about 200° about the vertical axis of rotation without significantly affecting the operation of the lure 10. On the other hand, the arc through which it may be pivoted about a horizontal axis must be substantially restricted because otherwise the possibility exists that the barbs could point down and into the bed 40. The illustrated restriction in the swinging movement of the hook 28 toward and away from the body 14 of about 120° would, of course, be greater or less for other bottom surface configurations than that illustrated.

Although the presently preferred embodiment has been described, it will be understood that within the purview of this invention various changes may be made within the scope of the appended claims.

Having thus described my invention, I claim:

1. A bottom running fish lure comprising a float body, a forwardly extending wiggle plate connected to said body constructed as a diving plate and having means for attachment to a fish line along the centerline thereof, said float body and said wiggle plate both being substantially symmetrical about a vertical plane of symmetry, rearwardly extending hook means having plural upwardly extending barbs located generally rearwardly of said body, means connecting said hook means to the underside of said float body substantially in said plane of symmetry for swinging movement through a restricted arc about a generally horizontal axis extending through the point of connection of said hook means to said body, the specific gravity of said lure relative to water being sufficient that said lure sinks in water and the combined weight of said wiggle plate and said hook means being sufficient in relation to said float body and in relation to one another to cause the forward end of said lure to point downwardly whereupon the forward edge of said wiggle plate and rearwardly located portions of said hook means will rest upon the bottom of a body of water in which said lure is used with said float body projecting above bottom and whereby said barbs invariably project upwardly as said lure sinks and as said lure is retrieved while running along the bottom of a body of water.

2. The lure of claim 1 wherein said means connecting said hook means to said float body comprises a restricted swing hanger which restricts the swinging movement of said hook means to a restricted arc of less than about 200° about a generally vertical axis extending through said hanger.

3. The lure of claim 1 wherein said float body has a substantially planar bottom surface to which said hook is connected, and wherein said restricted arc is less than about 120°.

4. The lure of claim 1 wherein said means connecting said hook means to said float body comprises a restricted swing hanger and fastener means fastening said hanger to said float body, said fastener means including a fastener extending through said hanger, at least a portion of said body, and said wiggle plate whereupon said wiggle plate and said hanger are rigidly interconnected.

* * * * *